United States Patent
Roemer

(10) Patent No.: US 10,195,823 B2
(45) Date of Patent: Feb. 5, 2019

(54) COMPOSITE COMPONENT

(71) Applicant: Dr. Ing. h.c. F. Porsche Aktiengesellschaft, Stuttgart (DE)

(72) Inventor: Dominic Roemer, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/729,139

(22) Filed: Jun. 3, 2015

(65) Prior Publication Data
US 2015/0343742 A1 Dec. 3, 2015

(30) Foreign Application Priority Data
Jun. 3, 2014 (DE) .................. 10 2014 107 803

(51) Int. Cl.
*B32B 15/08* (2006.01)
*B32B 15/088* (2006.01)
(Continued)

(52) U.S. Cl.
CPC ........ *B32B 15/088* (2013.01); *B29C 37/0082* (2013.01); *B29C 66/1122* (2013.01); *B29C 66/30321* (2013.01); *B29C 66/45* (2013.01); *B29C 66/72141* (2013.01); *B29C 66/7392* (2013.01); *B29C 66/742* (2013.01); *B29C 70/682* (2013.01); *B29C 70/78* (2013.01); *B29C 70/86* (2013.01); *B32B 15/08* (2013.01); *B32B 27/20* (2013.01); *B32B 27/32* (2013.01); *B32B 27/34* (2013.01); *B32B 27/40* (2013.01); *B29C 66/71* (2013.01); *B29C 66/7212* (2013.01); *B29K 2077/00* (2013.01); *B29K 2105/0809* (2013.01); *B29K 2105/256* (2013.01);
(Continued)

(58) Field of Classification Search
CPC ......... B32B 15/08; B32B 15/088; B32B 5/06; B32B 27/34; B32B 7/04; B32B 2377/00; B32B 7/08; B32B 2262/106; B32B 2260/02; B32B 2305/08; B32B 15/20; B32B 2307/558; B32B 2605/08; B32B 27/32; B32B 27/40; B29C 37/008; B29C 66/3032; B29C 66/45; B29C 37/0082; Y10T 428/31681
USPC ........... 428/99, 120, 139, 299.1, 457, 474.4, 428/475.5
See application file for complete search history.

(56) References Cited

U.S. PATENT DOCUMENTS

| | | | | | |
|---|---|---|---|---|---|
| 4,992,323 | A | * | 2/1991 | Vogelesang | ............. B32B 15/08 428/215 |
| 5,972,524 | A | * | 10/1999 | Childress | ............... B23K 31/02 403/266 |

(Continued)

*Primary Examiner* — Joanna Pleszczynska
(74) *Attorney, Agent, or Firm* — Gerald E. Hespos; Michael J. Porco; Matthew T. Hespos

(57) ABSTRACT

A composite component has a continuous-filament reinforced thermoplastic material (1) and a metallic insert (2), which is obtainable in that (a) a metallic insert (2) having pin structures (3) attached to the surface is provided, (b) firstly the pinned metallic insert (2) is inserted into a forming tool, (c) subsequently an optionally pre-heated organic sheet (1) manufactured from the continuous-filament reinforced thermoplastic (1) is disposed thereon, (d) the forming tool is closed and subsequent to a dwell time is optionally cooled to room temperature, and finally (e) the composite component (4) thus obtained is removed, is proposed.

8 Claims, 1 Drawing Sheet

(51) Int. Cl.
*B32B 15/20* (2006.01)
*B32B 7/04* (2006.01)
*B29C 37/00* (2006.01)
*B32B 27/32* (2006.01)
*B32B 27/34* (2006.01)
*B32B 27/40* (2006.01)
*B32B 5/06* (2006.01)
*B29C 70/68* (2006.01)
*B29C 70/78* (2006.01)
*B32B 27/20* (2006.01)
*B29C 70/86* (2006.01)
*B29C 65/00* (2006.01)
*B29K 77/00* (2006.01)
*B29K 105/08* (2006.01)
*B29K 105/00* (2006.01)
*B29K 705/00* (2006.01)

(52) U.S. Cl.
CPC ... *B29K 2705/00* (2013.01); *B32B 2262/0269* (2013.01); *B32B 2262/101* (2013.01); *B32B 2262/106* (2013.01); *B32B 2307/54* (2013.01); *B32B 2307/558* (2013.01); *B32B 2605/08* (2013.01); *B32B 2605/18* (2013.01); *Y10T 428/31678* (2015.04); *Y10T 428/31681* (2015.04)

(56) References Cited

U.S. PATENT DOCUMENTS

| | | | |
|---|---|---|---|
| 7,802,799 B1* | 9/2010 | Semmes | B29C 65/02 277/616 |
| 2009/0087259 A1* | 4/2009 | Bettinger | B29C 65/562 403/274 |
| 2010/0209185 A1* | 8/2010 | Kirth | F16G 11/00 403/292 |

* cited by examiner

COMPOSITE COMPONENT

CROSS REFERENCE TO RELATED APPLICATION

This application claims priority under 35 USC 119 to German Patent Appl. No. 10 2014 107 803.9 filed on Jun. 3, 2014, the entire disclosure of which is incorporated herein by reference.

BACKGROUND

1. Field of the Invention

The invention relates to a composite component configured from a continuous-filament reinforced thermoplastic material and a metallic insert including a plurality of pins.

2. Description of the Related Art

Fiber-composite materials, also referred to as composite materials, matrix materials, or organic sheets, represent a targeted combination of two or more materials that improve the properties of the individual components. Nature itself has refined the principle of absorbing forces by way of high-strength fibers as the best suited lightweight construction material. Wood, plant leaves, muscles, and bones are but a few examples of natural fiber-composite structures. The term fiber-composite material typically is understood to be a composite of high-strength fibers and a plastic material. Therefore, it is not surprising that composite materials of this type are being increasingly appreciated especially in the automobile and aircraft industries in which there is an ongoing struggle between the highest possible stability and the lowest possible weight.

The fibers are relevant in determining the mechanical properties of the composite, such as strength and rigidity. Glass, carbon and aramid generally are employed. Continuous filaments in the form of woven fabrics or cross-laid structures are exclusively employed for high-performance fiber-composites, that is to say that the length of the fibers corresponds to the size of the component.

However, decisive tasks also are assigned to the matrix material. The matrix material transmits the forces between the fibers, supports the fibers from buckling, and protects the fibers from external influences. A differentiation is made here between duroplastics and thermoplastics. Thermoplastics, such as PP, TPU, PA, and PPS, for example, offer considerable advantages in terms of formability, freedom of design (weldability, injectability together with other thermoplastics), shelf life, and recyclability, which is why polymers of this type are used almost exclusively in the automotive industry.

Lightweight components of this type, in particular body parts, made from sheet metal having a reinforcement structure of plastic are known from DE 10 2009 042 272 A1. The sheet metal is connected in a materially integral manner to a reinforcement layer of plastic, which in turn is connected in a materially integral manner with the reinforcement structure of plastic to improve the lightweight component in terms of deforming behavior and rigidity.

DE 10 2011 121 727 A1 discloses an internal door member with a main body composed of a composite ("organic sheet") shrouded by an injection-molded compound.

DE 10 2012 016 729 A1 discloses automotive components made from a reinforcement-fiber material composed of a fiber-composite material that includes a matrix of a matrix material and a multiplicity of reinforcement fibers embedded in the matrix. A reinforcement element also is embedded in the matrix and is composed of a reinforcement-element material that is different from the reinforcement-fiber material. The reinforcement-element material is metal or includes metal. This document also discloses that the composite components offer advantages in terms of energy absorption.

DE 10 2012 012 745 A1 discloses a hybrid structural element for a motor vehicle. The structural element has at least one metal element connected to a plastic element. The metal element and the plastic element are configured to lie next to one another in a predominant surface area of the structural element and are disposed in at least one surface area of the structural element while defining a cavity between them.

DE 10 2011 121 621 A1 discloses a method for manufacturing a hybrid component made of one metal component and one plastic component. Heat required for materially integral bonding the metal and plastic components takes place from residual heat remaining in the metal component from an upstream forming process. Thus, method energy required for connecting the metal and plastic components can be saved, so that a cost-effective method for manufacturing a metal-plastic hybrid component is provided.

Finally, U.S. Pat. No. 5,672,405 discloses a composite component in which a slots initially are punched into a metallic insert by a cruciform die, and the material at each punching location is pushed out in a cruciform manner. The insert is subsequently placed in a mold that is filled with a thermoplastic material, so that the insert is enclosed completely by the polymer.

It is disadvantageous that fiber-composite materials have only limited stability, such that severe deformation, even fragmenting, may occur when there is a collision, for example, when two vehicles crash into one another.

It is an object of the invention to provide a composite component based on continuous-filament reinforced thermoplastics, that is more stable and that is more capable of absorbing and distributing impact energy across the component to counteract deformation.

SUMMARY OF THE INVENTION

One aspect of the invention relates to a composite component that comprises a continuous-filament reinforced thermoplastic material and a metallic insert. The metallic insert has a pin structure on one surface. The pins of the pin structure penetrate into the thermoplastic material.

A second aspect of the invention relates to a method for manufacturing a composite component that includes a continuous-filament reinforced thermoplastic material and a metallic insert. The method includes providing a metallic insert having pin structures attached to a surface. The method then includes placing the pinned metallic insert into a forming tool. An optionally pre-heated organic sheet then is disposed on the pins and the forming tool is closed so that the pin structure penetrates the organic sheet. The composite component may be retained in the forming tool for a dwell time and may be cooled to room temperature. Finally, the composite component is removed from the forming tool.

It surprisingly has been found that a particular advantage is obtained by using continuous-filament reinforced plastic materials ("organic sheets") for inserts having a multiplicity of pins disposed thereon and introduced into the manufacturing process as early as during forming. Thus, loads, such as those in the case of a crash, absorb energy, and can be incorporated directly into the laminate in a manner that is suited to the fiber-composite in that the pinned surfaces are pulled through the laminate. In this way, deformation of the component is counteracted.

The metallic insert may be a workpiece made of steel, aluminum, or a steel or aluminum alloy. The dimensions of the workpiece here are non-critical and exclusively depend on the later application purpose. The inserts have between about 50 and about 120, preferably about 80 to about 100 pins per square decimeter, and elevations having a height in the range of about 1 to about 10 mm, and in particular about 2 to about 5 mm. Workpieces of this type may be provided for example by compressive molding, punching, or welding.

The composite materials or else the organic sheets comprise two components, the fibers and the polymers. Fiber types to be considered are glass, carbon, and/or aramid.

Glass fibers are distinguished by high tensile and compressive strength, low density, and low thermal expansion at high thermal and chemical resistance; moreover, glass fibers have a low electrical conductivity. Aramid fibers have an even lower density, with particularly high impact properties. However, the preferred fibers are carbon fibers, which have the advantage of an even higher tensile and compressive strength and very high tensile and compressive moduli, in comparison with glass fibers. Carbon fibers have a low density, are chemically and thermally resistant, hardly expand when heated, and have good electrical conductivity.

PP, PA, TPU, and/or PPS are examples of well suited polymers and thermoplastic materials, respectively. Polypropylene (PP) is one of the most widely used thermoplastics. The melting temperature of PP is 165° C. It is formed at approx. 185 to 205° C., and its continuous service temperature is 90° C. It is highly chemically resistant.

The melting temperature of thermoplastic polyurethane (TPU) is 180° C. It is formed at approx. 220 to 240° C., and its continuous service temperature is 90° C. The material is very impact-resistant even at low temperatures and is easy to adhesively bond, to paint, and to insert-mold.

Polyphenylene sulfide (PPS) has an extraordinarily good chemical resistance, a very good resistance to temperature and good mechanical properties. The melting temperature of PPS is 280° C. It is formed at approx. 300 to 320° C., and its continuous service temperature is 220° C. PPS also satisfies all fire-safety requirements and may thus be employed in aircraft interiors.

However, the preferred polymers in the context of the present invention are polyamides (PA). Examples include PA6 which is particularly easy to form. The melting temperature of PA6 is 220° C. It is formed at approx. 240 to 260° C., and its continuous service temperature is 120° C. An alternative thereto is PA12 which has a very good surface quality and resistance to UV. The melting temperature of PA12 is 180° C. It is formed at approx. 200 to 240° C., and its continuous service temperature is 90° C. However, PA6.6 which has a melting temperature of 260° C. is preferred. It is formed at approx. 280 to 300° C., and its continuous service temperature is 130° C.

In summary, organic sheets which have carbon fibers as a fiber component and polyamide 6.6 as a polymer component are preferred.

The forming process may be performed in a known manner, such as compressive forming, as is described in detail by DIN 8583. Forming preferably is carried out in a warm state. In as far as other process data are relevant, reference is made to the abovementioned standard, the disclosure of which incorporated herein in its entirety by way of reference.

In summary, the invention thus expressly relates to a component that is a metallic insert having pins attached thereon, in a matrix of continuous-filament reinforced thermoplastic materials.

A further subject matter of the invention relates to the use of the component or the components, respectively, according to the invention which is/are obtained by the claimed method according to the invention, for installation in motor vehicles and/or aircraft.

Further advantages, features, and details of the invention are derived from the following description of preferred exemplary embodiments, as well as by means of the drawing. The features and combinations of features mentioned above in the description, as well as the individual features and combinations of features mentioned herebelow in the description of the figures and/or shown in the figures are not only to be used in the combination stated in each case but also in other combinations or as a standalone, without departing from the scope of the invention. Identical elements or elements with identical functions have been assigned identical reference signs. For reasons of clarity it is possible for elements not to be provided with their reference sign in all figures while however retaining their assignation.

DETAILED DESCRIPTION

Figure 1:
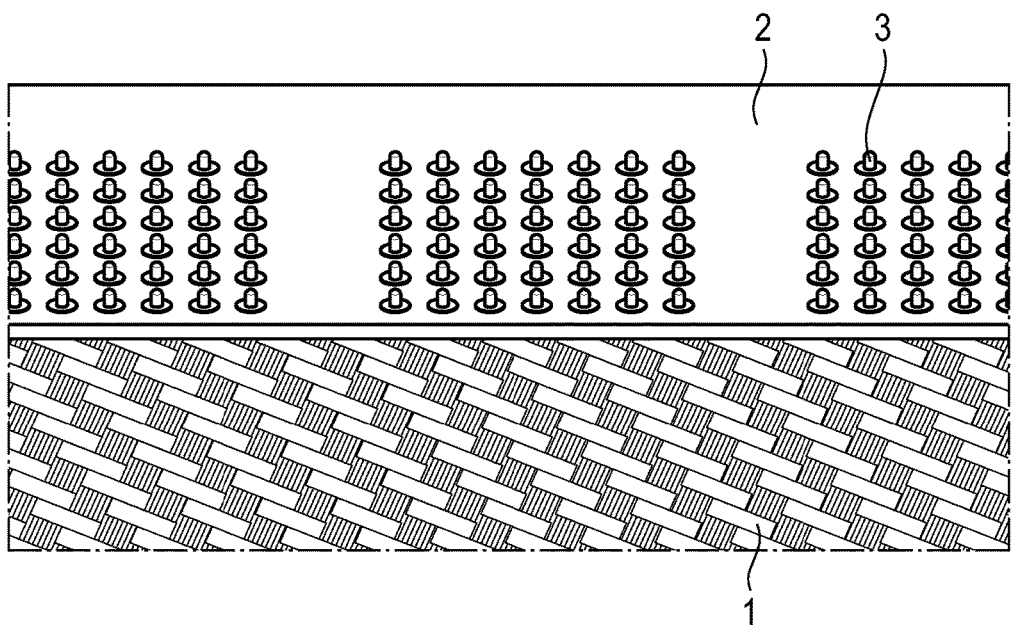
FIG. 1 in a perspective view shows a metallic insert and an organic sheet.
Figure 2:
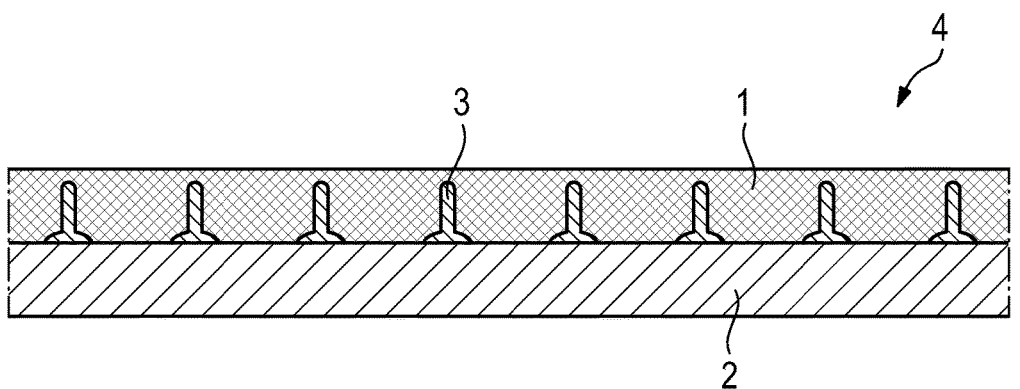
FIG. 2 in a section shows a detail of a composite component according to the invention.

The forming process is explained in more detail by means of FIGS. 1 and 2. In FIG. 1 an organic sheet manufactured from a continuous-filament reinforced thermoplastic material 1 and the metallic insert 2 provided with the pins 3 can be seen. The two parts 1, 2 are placed in a forming tool (not illustrated in more detail) and jointly compressed so that the pins 3 penetrate into the fiber-composite material 1 without completely penetrating therethrough, as is illustrated in FIG. 2. In the event of an impact, the released mechanical energy causes the pins 3 to be driven more deeply into the laminate 1, thereby reinforcing the continuous-filament reinforced thermoplastic material 1, this however precisely counteracting deformation of the composite component 4.

What is claimed is:

1. A composite impact-absorbing component of a motor vehicle, comprising:
   a metallic workpiece having opposite smooth first and second surfaces;
   a plurality of pin structures, each of the pin structures having a base attached to the first surface of the metallic workpiece, and a pin projecting from the base and away from the first surface of the metallic workpiece so that all of the pins are substantially parallel, each of the pins having a uniform width that is narrower than the base and each of the pin structures projecting from the first surface of the metallic workpiece in a common direction by a selected projecting distance, the second surface of the metallic workpiece being free of the pins; and
   an organic sheet formed from a continuous-filament reinforced thermoplastic material having opposite first and second surfaces defining a selected uniform thickness across all of the organic sheet that is greater than the projecting distance of the pin structures from the first surface of the metallic workpiece, the first surface of the organic sheet being pressed onto all of the first surface of the metallic workpiece so that the pin structures penetrate into the continuous-filament reinforced thermoplastic material to a position spaced inward from the second surface of the organic sheet, and the organic sheet being oriented so that the second surface of the organic sheet faces away from the metallic workpiece and so that none of the organic sheet is applied to the second surface of the metallic workpiece with the second surface of the organic sheet and the second surface of the metallic workpiece defining external surfaces of the composite impact-absorbing component, whereby an impact applied to the composite component causes the pin structure to penetrate more deeply into the organic sheet and to absorb energy of the impact and to provide additional reinforcement, thereby resisting deformation of the composite component.

2. The composite component of claim 1, wherein that the metallic workpiece is composed of steel, aluminum, or a steel or aluminum alloy, respectively.

3. The composite component of claim 1, wherein the metallic workpiece includes about 50 to about 120 pins per square decimeter.

4. The composite component of claim 1, wherein the organic sheet contains glass fibers, carbon fibers, and/or aramid fibers as the continuous filament.

5. The composite component of claim 4, the organic sheet contains polypropylene, polyamide, thermoplastic polyurethane, and/or polyphenylene sulfide.

6. The composite component claim 5, wherein the organic sheet represents a composite of carbon fibers and polyamide 6.6.

7. The composite component of claim 1, wherein the pins projecting from the first surface of the metallic workpiece are surrounded by a matrix of continuous-filament reinforced thermoplastic material.

8. A dimensionally stable impact-absorbing body part of a motor vehicle, comprising:
   a metallic workpiece having opposite smooth first and second surfaces;
   a plurality of pin structures, each of the pin structures having a base attached to the first surface of the metallic workpiece, and a pin projecting from the base and away from the first surface of the metallic workpiece so that all of the pins are substantially parallel, each of the pin structures having a projecting distance of between 2 mm and 5 mm and each of the pins having a uniform width that is narrower than the base and that is less than half of the projecting distance of the pin structure, each of the pin structures projecting from the first surface of the metallic workpiece in a common direction by a selected projecting distance, the second surface of the metallic workpiece being free of the pins; and
   an organic sheet formed from a continuous-filament reinforced thermoplastic material having opposite first and second surfaces defining a selected uniform thickness across the organic sheet that is greater than the projecting distance of the pin structures from the first surface of the metallic workpiece, the first surface of the organic sheet being pressed onto all of the first surface of the metallic workpiece so that the pin structures penetrate into the continuous-filament reinforced thermoplastic material to a position spaced inward from the second surface of the organic sheet, and the organic sheet being oriented so that the second surface of the organic sheet faces away from the metallic workpiece and so that none of the organic sheet is applied to the second surface of the metallic workpiece with the second surface of the organic sheet and the second surface of the metallic workpiece defining external surfaces of the impact-absorbing body part, whereby an impact applied to the impact-absorbing body part causes the pin structure to penetrate more deeply into the organic sheet and to absorb energy of the impact and to provide additional reinforcement, thereby resisting deformation of the impact-absorbing body part of the motor vehicle.

\* \* \* \* \*